(12) United States Patent
White

(10) Patent No.: US 11,230,329 B1
(45) Date of Patent: Jan. 25, 2022

(54) DRAG REDUCTION DEVICE AND METHOD FOR WHEELED VEHICLES

(71) Applicant: Steve White, Maple Plain, MN (US)

(72) Inventor: Steve White, Maple Plain, MN (US)

(*) Notice: Subject to any disclaimer, the term of this patent is extended or adjusted under 35 U.S.C. 154(b) by 167 days.

(21) Appl. No.: 16/700,691

(22) Filed: Dec. 2, 2019

Related U.S. Application Data

(60) Provisional application No. 62/773,850, filed on Nov. 30, 2018.

(51) Int. Cl.
*B62D 35/00* (2006.01)

(52) U.S. Cl.
CPC ......... *B62D 35/001* (2013.01); *B62D 35/007* (2013.01); *B62D 35/008* (2013.01)

(58) Field of Classification Search
CPC ... B62D 35/001; B62D 35/007; B62D 35/008
See application file for complete search history.

(56) References Cited

U.S. PATENT DOCUMENTS

| | | | |
|---|---|---|---|
| 4,035,013 | A | 7/1977 | Abbott, III |
| 4,156,543 | A | 5/1979 | Taylor et al. |
| 4,257,640 | A | 3/1981 | Wiley |
| 5,058,945 | A | 10/1991 | Elliot, Sr. et al. |
| 6,428,084 | B1 | 8/2002 | Liss |
| 7,976,096 | B2 | 7/2011 | Holubar |
| 9,139,238 | B2 | 9/2015 | Visser |
| 2007/0013209 | A1 | 1/2007 | Neuburger et al. |
| 2007/0046067 | A1* | 3/2007 | Verona ............ B62D 35/001 296/181.6 |

\* cited by examiner

*Primary Examiner* — Lori L Lyjak
(74) *Attorney, Agent, or Firm* — James M. Duncan; Scanlon Duncan LLP

(57) ABSTRACT

An air drag reduction apparatus attaches to the rear of vehicles having a generally rectangular rear end, such as tractor trailers, busses, and recreational vehicles. A left side roller is mounted in a generally vertical orientation to the rear of the vehicle and a right side roller is mounted in a generally vertical orientation to the rear of the vehicle, where the left side roller and the right side roller are each rotatable about a vertical axis. The left side roller and the right side roller may be mounted with attachment mechanisms which allow the rollers to each be moved out of the way as the rear door or doors of the vehicle are opened.

20 Claims, 14 Drawing Sheets

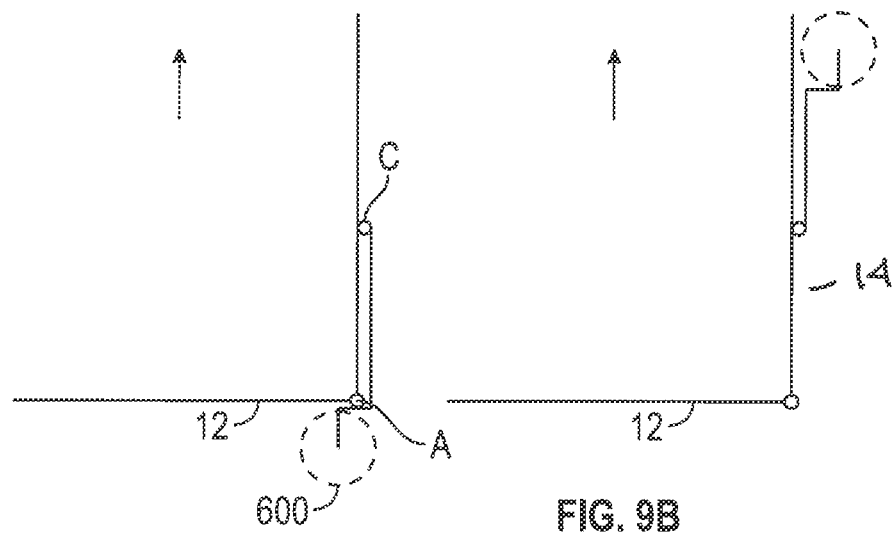
FIG. 9A
FIG. 9B
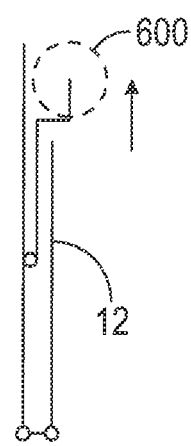
FIG. 9C

DRAG REDUCTION DEVICE AND METHOD FOR WHEELED VEHICLES

RELATED APPLICATION

This application claims domestic priority to U.S. Provisional Application 62/773,850 filed Nov. 30, 2018.

BACKGROUND OF THE INVENTION

Drag is known to have a significant impact on the fuel efficiency of tractor-trailer trucks. Such vehicles, operating in the United States, were estimated in 2012 to consume approximately 30 billion gallons of fuel per year. Because of the magnitude of fuel usage for such vehicles, implementing measures which improve fuel efficiency can have a significant impact on overall usage and the emissions resulting from such usage.

As reported in the prior art, a reduction in drag can have a substantial positive impact on fuel economy. One approach to reducing drag is make modifications to the trailer. Recognized areas for addressing the aerodynamics of a trailer are at the gap between the tractor and the trailer, at the underbody of the trailer, and at the rear of the trailer. However, opportunities for improving the aerodynamics of the gap area are diminishing because of the evolution of improved aerodynamics for new tractors. Thus, tractor-to-trailer gap management devices are typically only necessary for older tractors which require a higher tractor-to-trailer gap for maneuverability. The common approach to improving the aerodynamics of the underbody is to employ underbody skirts which prevent wind from ducking in under the trailer and running into the non-aerodynamic trailer bogie—the subassembly of axles and wheels that support the trailer.

With respect to the rear of a trailer, devices which mount to the rear of the trailer are generally called boat tails or trailer wake devices. These devices modify the air flow as it leaves the trailing edge of the side and top of the trailer. Low pressure on the trailer base due to the aerodynamic wake, combined with high pressure on the front face of the vehicle, causes a net pressure differential that generates a force in the downwind direction. Increasing the base pressure reduces this differential and reduces the net drag on the vehicle. Tapering the back end of the vehicle increases the base pressure by providing pressure recovery of the surrounding flow before it leaves the sharp back edges and forms a wake. The increased base pressure provides a lowered overall pressure difference from front to back of the tractor-trailer combination.

However, while the positive impact of drag reduction devices is recognized in the literature, widespread acceptance of these devices on the rear of trailers has not been realized. One reason is that there remains doubt regarding the overall benefit of the devices in relation to their cost. In addition, the inventor herein suspects another reason for the lack of broad acceptance is that there are operational barriers which negatively impact the cost/benefit ratio. For example, drag reduction devices typically employ structures or appurtenances which extend outwardly from the body of the tractor-trailer truck. The devices add to the overall weight of the vehicle. Such structures can present maintenance challenges and can reduce the overall clearance of tractor-trailer truck. All such devices will require at least a minimal increase in maintaining the vehicle. There are also questions regarding the durability, reliability, and ease of use of the devices in day-to-day operations.

Some drag reduction devices also present operational problems. One of the operational problems presented by some drag reduction devices is that the devices can interfere with the loading and unloading operations for the tractor-trailer truck. For example, devices which mount to or near the rear of a vehicle can interfere with the opening and closing of the doors of the trailer, whether roll-up doors or swing doors which open outwardly. However, because of the substantial benefits to be gained in fuel economy with the use of such devices, a drag reduction device which is effective and which has a minimal impact on the operating ease of the tractor-trailer is desirable.

SUMMARY OF THE INVENTION

Embodiments of the present invention provide an answer to the need identified above. An embodiment of the disclosed air drag reduction apparatus is used for a vehicle or vehicle trailer (collectively referred to as "vehicle") having a left side, a right side, and a generally rectangular rear end. As will be recognized, this description most aptly applies to trailers pulled by semi tractors, but it may also apply to recreational vehicles, large vans, buses, etc. For the applicable vehicles, the rectangular rear end has a left edge defined by the attachment of the generally rectangular rear end to the left side and it has a right edge defined by the attachment of the generally rectangular rear end to the right side.

An embodiment of the apparatus has a left side bracket mechanism and a right side bracket mechanism attached to the vehicle. A left side cylindrical roller is mounted to the left side bracket mechanism in a vertical orientation. A first longitudinal axis is defined by the left side vertical roller. The left side cylindrical roller is rotatable about the first longitudinal axis with respect to the left side bracket mechanism. Likewise, a right side cylindrical roller is mounted to the right side bracket mechanism in a vertical orientation. A second longitudinal axis is defined by the right side vertical roller, and the right side cylindrical roller is rotatable about the second longitudinal axis with respect to the right side bracket mechanism. The apparatus may be positioned such that in an operational mode the cylindrical rollers on each side are entirely behind the vehicle or partially extending past each side of the vehicle.

In some embodiments of the invention, the position of the left cylindrical roller is variable, such that it may be repositioned through a pivoting left side bracket mechanism. In these embodiments, the left cylindrical roller may be initially positioned entirely behind the vehicle, which is defined as the left side cylindrical roller first position or operating position. Optionally, the left cylindrical roller may be repositioned such that a portion of the left cylindrical roller extends outwardly past the left edge of the vehicle. When so placed, there is defined a left side cylindrical roller second position or the unloading position. Likewise, the right cylindrical roller may be repositioned through a pivoting right side bracket mechanism such that the right cylindrical roller may initially be positioned entirely behind the vehicle, which is defined as the right side roller first position or operating position. Optionally, the right cylindrical roller may be repositioned such that a portion of the right side cylindrical roller extends outwardly past the right edge of the vehicle. When so placed, there is defined a right side cylindrical roller second position or the unloading position.

In some embodiments of the invention, the left side bracket mechanism is attached to the left side of the vehicle and the right side bracket mechanism is attached to the right side of the vehicle. It is to be appreciated that the various bracket mechanisms may be mounted on the sides of the vehicle, mounted to the portion of the vehicle top adjacent to the side of the vehicle, mounted to the back or back door of the vehicle or mounted to a combination of any of these locations, where the configuration of the bracket mechanisms provides for these different mounting options.

In yet another embodiment of the invention, the left side bracket mechanism may include a pivoting mechanism which provides for pivoting the left side cylindrical roller away the rear of the vehicle or from the left side cylindrical roller first position or from the left side cylindrical roller section position to a position adjacent to the left side of the vehicle, defined as the left side cylindrical roller unloading position. Likewise, the right side bracket mechanism may include a pivoting mechanism which provides for pivoting the right side cylindrical roller away from the rear of the vehicle or from the right side cylindrical roller first position or from the right side cylindrical roller second position to a position adjacent to the right side of the vehicle, defined as the right side cylindrical roller unloading position. When such brackets are utilized, the left side bracket mechanism is pivotable so that the left side cylindrical roller may be moved from the rear of the vehicle or from the left side cylindrical roller first position or from the left side cylindrical roller second position to the left side cylindrical roller unloading position. Likewise, the right side bracket mechanism may be pivotable to move the right side cylindrical roller from the rear of the vehicle or from right side cylindrical roller first position or from the right side cylindrical roller second position to the right side cylindrical roller unloading position.

In the configurations having the pivotable bracket mechanisms described above, if the rear of the vehicle has swing open doors comprising a left side door and a right side door, when the doors are in a closed position, the left side cylindrical roller may be in the left side cylindrical roller first position or operating position and the right side cylindrical roller may be in the right side cylindrical roller first position or operating position. However, if it is desirable to open the left side door and the right side door completely (i.e., such that the left side door is swung approximately 270 degrees and placed adjacent the left side of the vehicle and the right side door is swung approximately 270 degrees and placed adjacent the right side of the vehicle) such that the doors are placed in an unloading position, the left side cylindrical roller may be placed manually into the left side cylindrical roller unloading position and the right side cylindrical roller may be placed into right side cylindrical roller unloading position, such that the rollers are moved out of the way. In some embodiments, the opening of the trailer doors will simultaneously move the each of the rollers into the unloading positions.

The cylindrical rollers may have axially aligned openings and an axle may extend completely through the axially aligned opening. Alternatively, the cylindrical rollers may be mounted to the bracket mechanisms without axles. If an axle is utilized, it may span the top and bottom brackets and supported there between. The axles may be stationary such that the cylindrical roller spins on the axle. Alternatively, the axles may spin such that the cylindrical roller and axle spin together. A motor may also be attached to the cylindrical roller or the axle to which a cylindrical roller is mounted. With a motor, the rotational speed of the cylindrical roller may be increased. Alternatively, the cylindrical roller can be rotated simply by the force imparted to the roller edges as the roller is impacted by the air flowing by the roller as the vehicle travels. Obviously, for this latter type of device, the higher the vehicle velocity, the greater the rotational speed of the roller.

The cylindrical rollers for each side may comprise a single vertical segment. Alternatively, each cylindrical roller may comprise a plurality of axially adjacent roller segments disposed in a stacked configuration. The cylindrical rollers may also be fashioned in a lobe or vane configuration, where the roller has longitudinal divisions which segment the roller. The exterior surface of the rollers may be dimpled or have other surface texture which enhances the drag reduction impact.

Embodiments of the invention may utilize an airfoil to direct the air flow to pass over the roller edge, which may be used when the roller is positioned entirely behind the vehicle. In these embodiments the airfoil may comprise a structure which curves around a back corner of the vehicle and directs air flow to pass over and around the roller. Each air foil may comprise a surface having a leading edge and a trailing edge. Alternatively, some embodiments of the invention may utilize a roller shape and configuration which does not utilize airfoils to direct air flow without a portion of the roller extending outwardly past the edges of the vehicle.

Embodiments of the invention may further comprise a wind catching fan member attached to the roller to provide additional rotational velocity to the roller. In another embodiment of the invention, a multiplier unit utilizing gears or belts and sheaves may be disposed between the wind catching fan and the roller to provide additional rotational velocity to the roller. It is to be appreciated that a motor may be installed in the same position as the wind catching fan, such that the motor imparts rotation to the roller. Such a motor may have a controllable speed which may be adjusted according to the observed fuel consumption, so that the motor speed may be adjusted to minimize drag and improve fuel efficiency.

BRIEF DESCRIPTION OF THE DRAWINGS

FIGS. 9A through 9C depict a second mechanism which allows the roller to be manually pivoted out of the way to allow the opening of a door of the trailer.

DETAILED DESCRIPTION OF THE INVENTION

Figure 1:
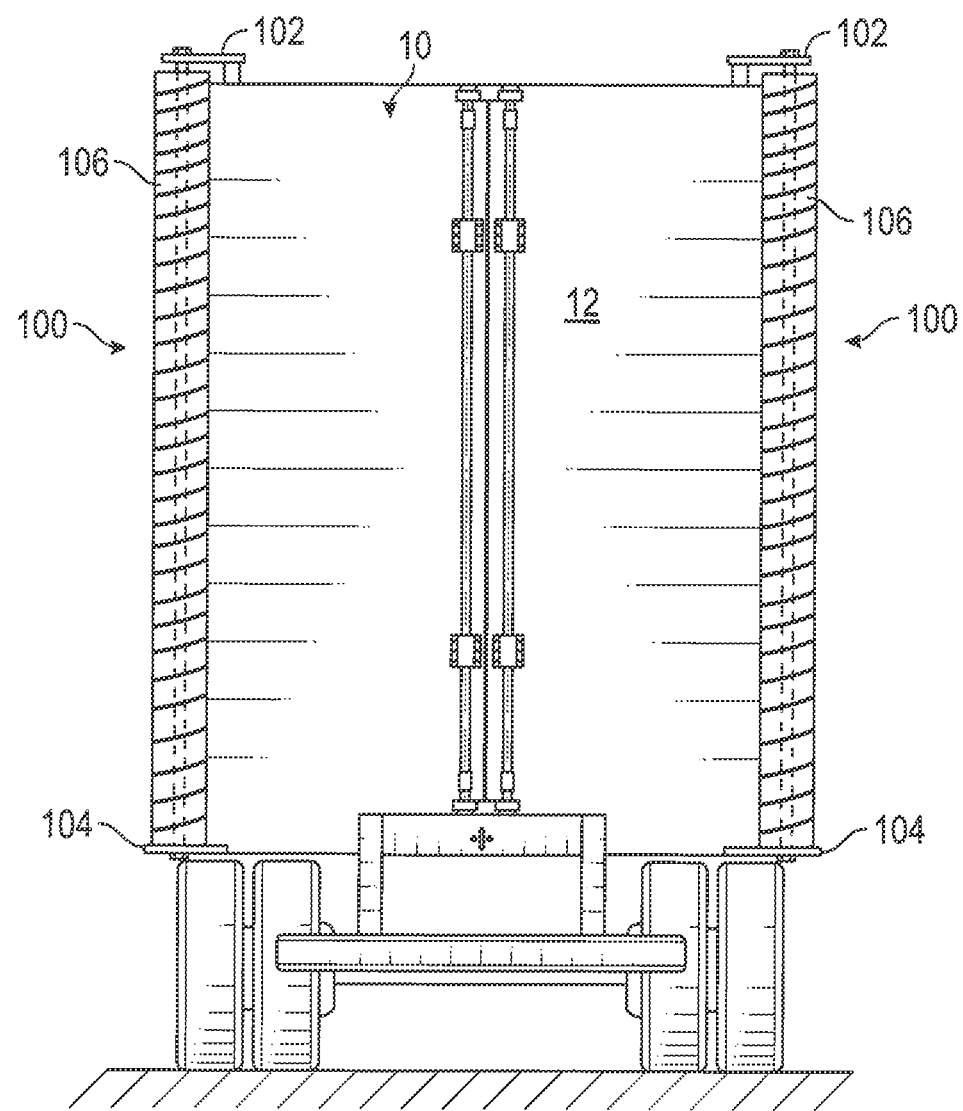
FIG. 1 shows the rear of a trailer showing an embodiment of the disclosed vertical rollers mounted on either side of the trailer.

Referring now to the figures, FIG. 1 shows the rear of a trailer 10 having doors 12. An embodiment of the disclosed vertical rollers 100 are mounted on either side of the trailer 10, where each roller spans between an upper bracket 102 and a lower bracket 104. While FIG. 1 shows the upper bracket 102 affixed to the to top 16 of the trailer 10, it is to be appreciated that that the upper brackets can also be attached to the doors 12 of the trailer. The vertical rollers 100 of the embodiment depicted in FIG. 1 have an axle 106 extending the entire length of the roller 100, however embodiments of the invention may have a full axle as depicted in FIG. 1, a partial axle or no axle at all.

Figure 2:
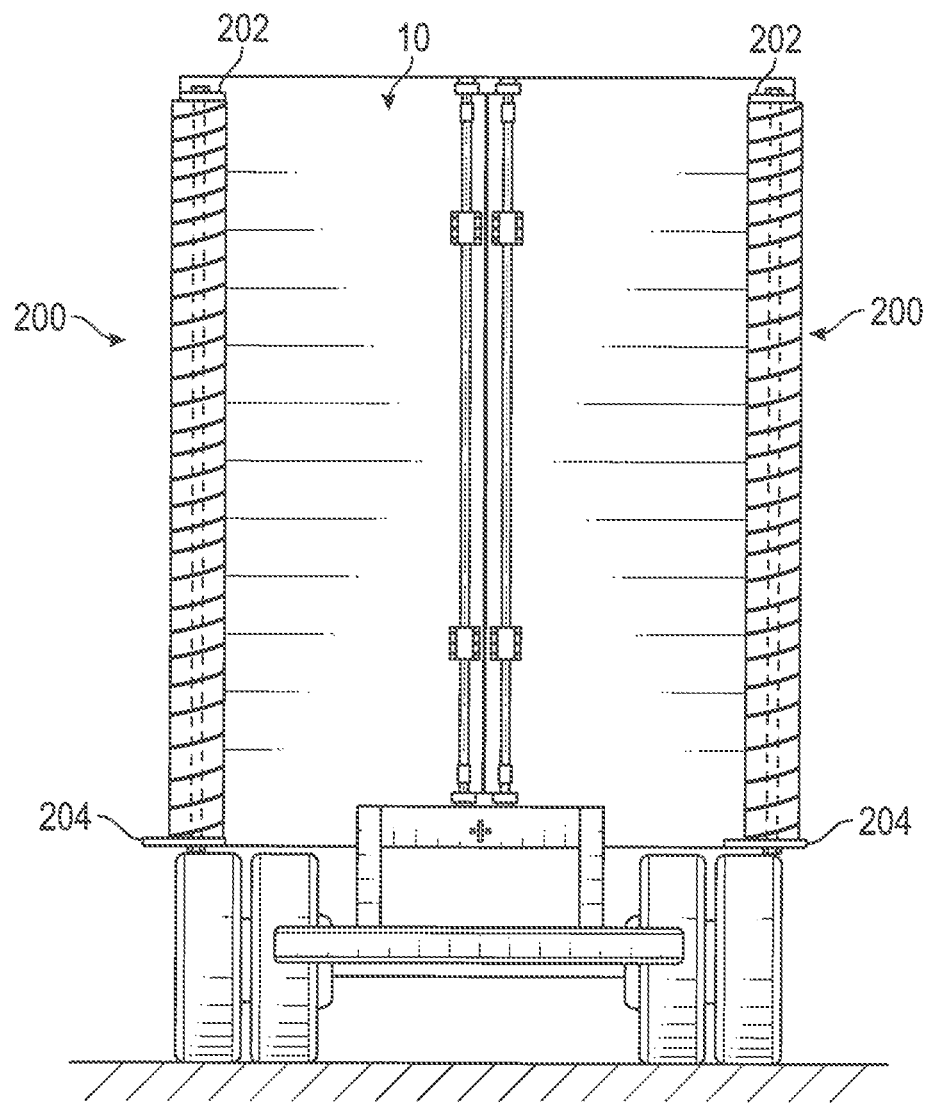
FIG. 2 shows the rear of a trailer showing another embodiment of the disclosed vertical rollers mounted on either side of the trailer.

FIG. 2 shows the rear of a trailer 10 showing another embodiment of the disclosed vertical rollers 200 which are mounted on either side of the trailer. Each roller spans between an upper bracket 202 and a lower bracket 204 each mounted to door 12 at the back of trailer 10.

Figure 3:
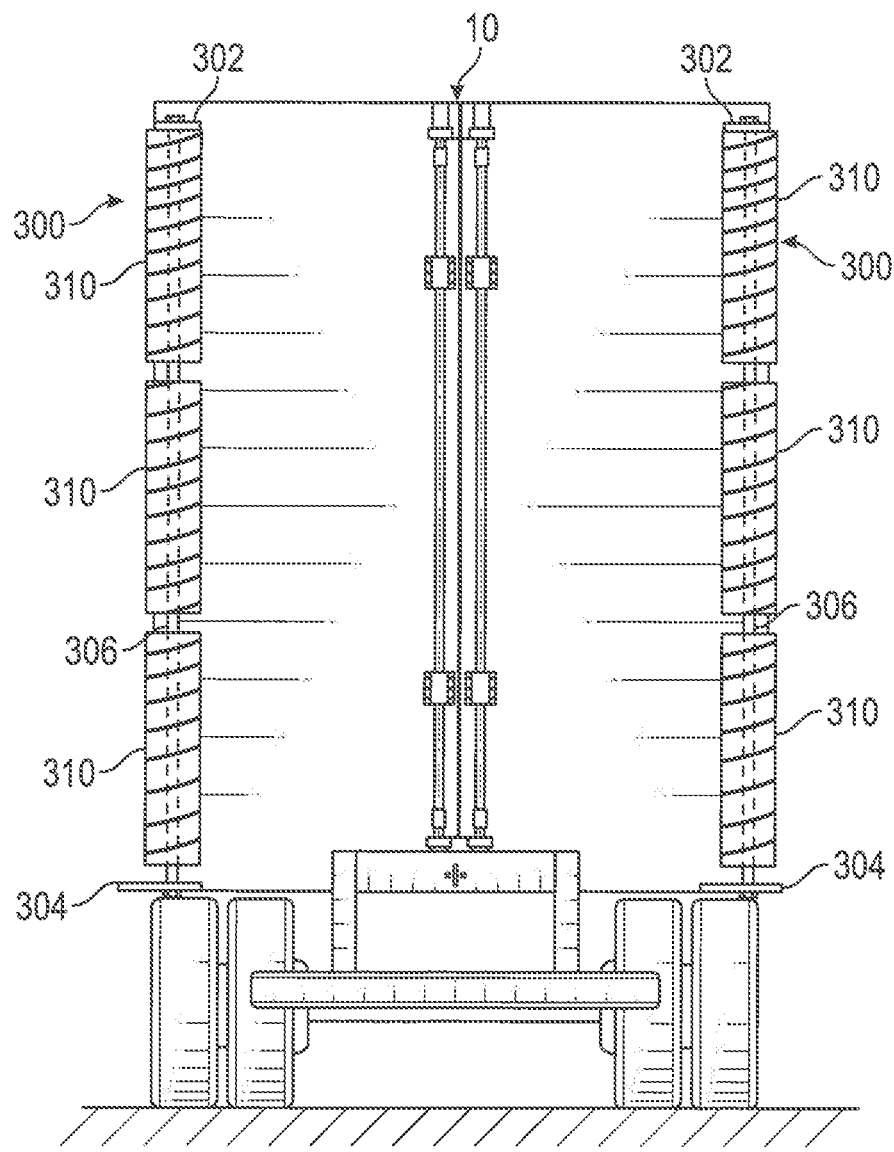
FIG. 3 shows the rear of a trailer showing another embodiment of the disclosed vertical rollers mounted on either side of the trailer.

FIG. 3 shows an embodiment of the invention which utilizes segmented vertical rollers 300 mounted on either side of the trailer. In this embodiment, each vertical roller 300 comprises a plurality of axially adjacent roller segments 310 disposed on axles 306, which span between an upper bracket 302 and a lower bracket 304 each mounted to door 12. Alternatively, each axially adjacent roller segment 310 may span between its own upper bracket and lower bracket. Each roller segment 310 may be keyed to engage an adjacent roller segment where rotation of a single roller segment will cause all roller segments on each side to rotate. In addition, a plurality of roller segments 310 may be disposed on a single axle. In one embodiment of this configuration, the roller segments may be keyed to the axle, such that rotation of the axle rotates each of the roller segments. An embodiment of this configuration may utilize a motor or other device to impart rotation to the axle and thus to each of the roller segments.

Figure 4:
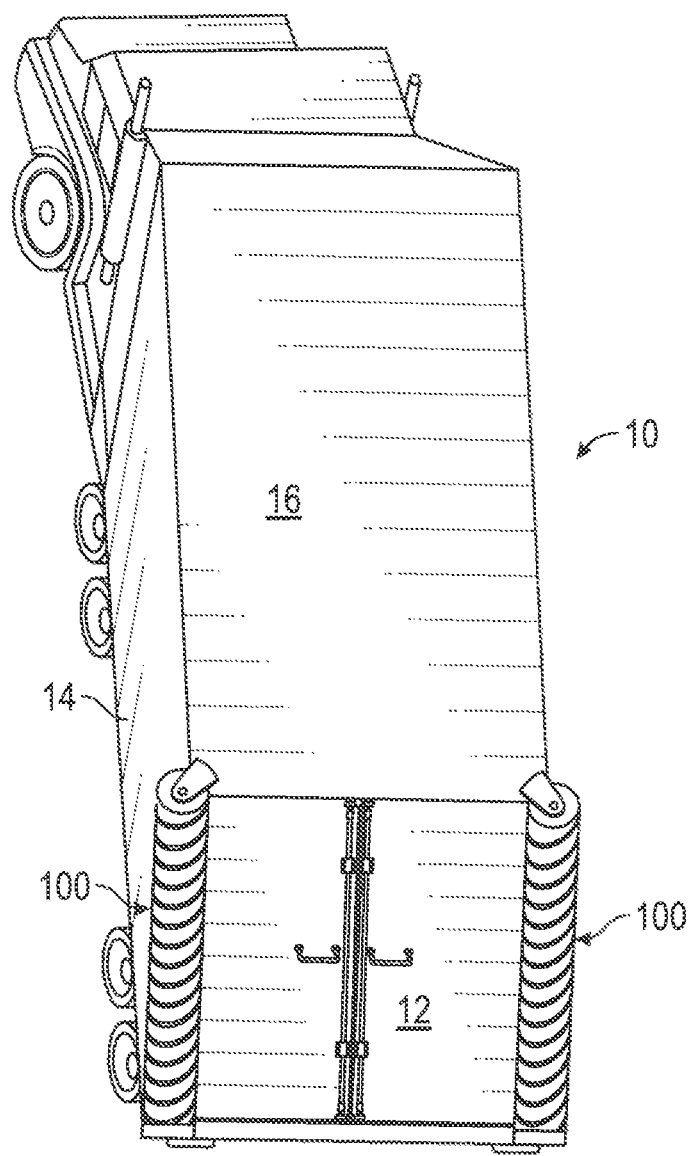
FIG. 4 shows an oblique upper view showing a trailer with an embodiment of the disclosed vertical rollers mounted on either side of the trailer.

FIG. 4 shows an oblique upper view showing trailer 10 have a top 16 with an embodiment of the disclosed vertical rollers 100 mounted on either side of the trailer with the upper brackets 102 mounted to the top 16 and lower brackets 104 mounted to the chassis of the trailer 10. The vertical rollers 100 depicted in FIG. 4 have a portion of the cylindrical roller 100 extending outwardly past the edges of the sides 14 of the vehicle 10. However, upper brackets 102 and lower brackets 104 may be pivotable such that the cylindrical rollers 100 may be pivoted into a position which places the cylindrical rollers 100 completely behind trailer 100, with no portion of the rollers extending outwardly past the edges of the sides 14.

Figure 5:
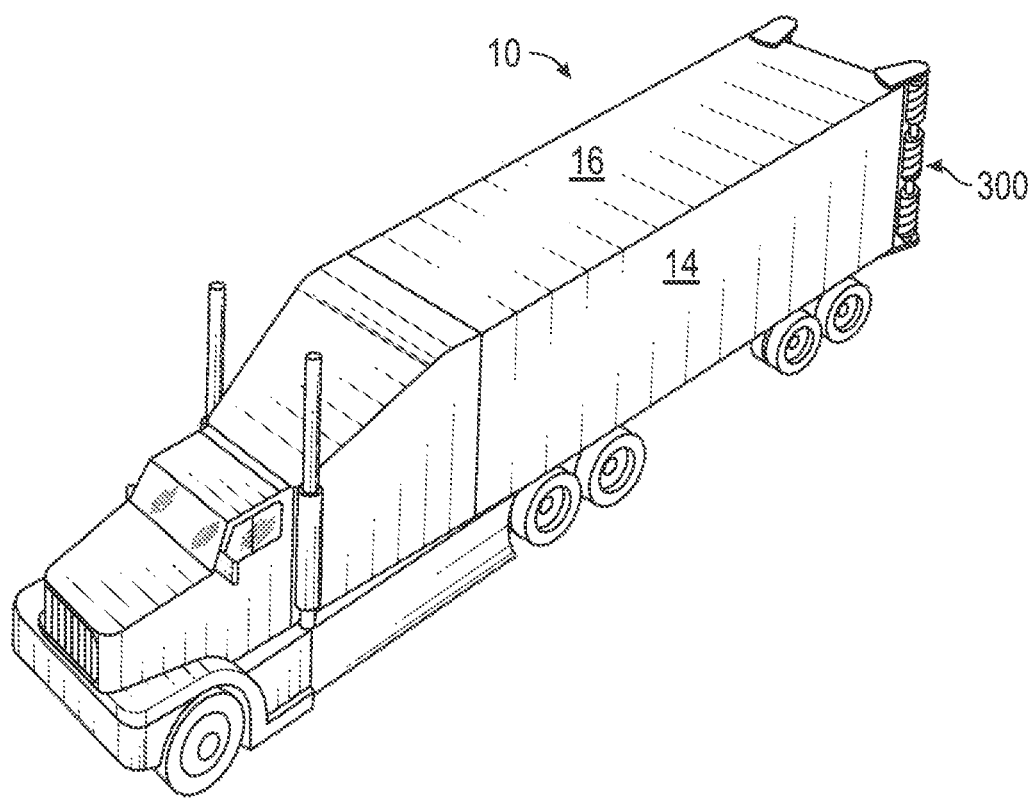
FIG. 5 shows a perspective top view of a trailer equipped with vertical rollers.

FIG. 5 shows a perspective view of a trailer 10 equipped with segmented vertical rollers 300 which utilizes pivoting upper brackets 102 and lower brackets 104 as described above.

Figure 6:
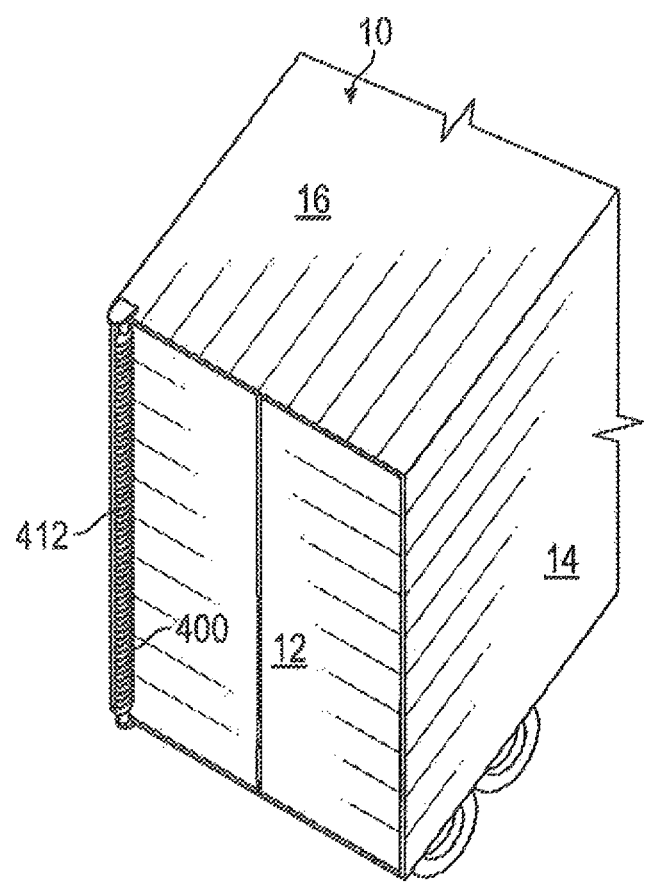
FIG. 6 shows a trailer equipped with another embodiment of the disclosed vertical rollers where the rollers are mounted to be completely behind the trailer.
Figure 7:
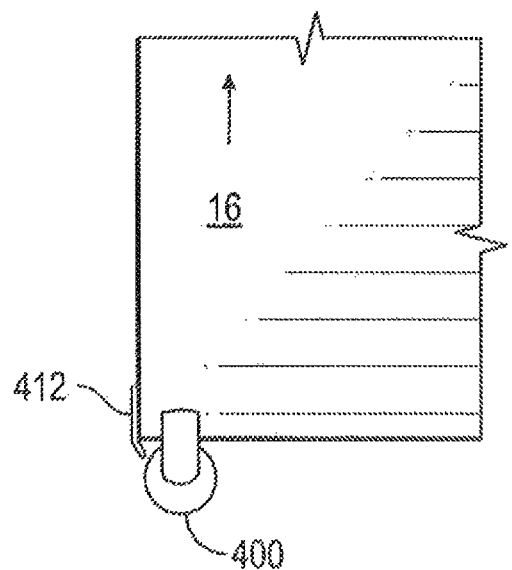
FIG. 7 schematically depicts a top view of a portion of a trailer having a vertical roller and an air foil.

FIGS. 6 and 7 show an embodiment of the invention in which the vertical rollers 400 are mounted to be completely behind trailer 10. In this embodiment an optional air foil 412 may be used to assist in directing air flow around the roller 400. FIG. 7 schematically depicts a top view of this embodiment. While FIGS. 6 and 7 show a single vertical roller 300 attached to the left side of trailer 10, it is to be appreciated that a second vertical roller may be attached to the right side of trailer 10 as depicted for the other embodiments. Air foil 412 may be fabricated from a light weight material, such as sheet metal, composite, or like material. Air foil 412 has a gentle bend which does not touch vertical 400. A similar air foil may be utilized for a second vertical roller attached to the right side of trailer 10.

FIGS. 8 through 13 depict different embodiments of brackets which may be utilized with different embodiments of vertical rollers which may be deployed from the operational positions shown in FIGS. 1-7 to an unloading position which allows the rollers to be pivoted out of the way for unloading of the trailer 10. For trailers 10 having double outward-swinging doors 12, as depicted in FIGS. 1-4, the trucks are generally unloaded by swinging doors 12 almost 270 degrees, such that each door 12 is parallel to each side 14 of the trailer. If the vertical rollers are attached to the doors 12, such as depicted in FIGS. 2 and 3, the vertical rollers will swing with the doors. However, unless the rollers 200, 300 have a minimal profile (i.e., have limited extension past the doors 12), the rollers 200, 300 will impact the sides 14 of the trailer 10 and not allow the doors 14 to be completely swung out of the way. While it may not be necessary for purposes of unloading the truck to swing the doors completely out of the way, in some large shipping bays truck trailers are backed into the bay in a parallel configuration. In such cases it may be desirable to configure the roller brackets to allow the rollers to be completely pivoted out of the way into an unloading position, such as those depicted in FIGS. 8 through 13.

Figure 8A:
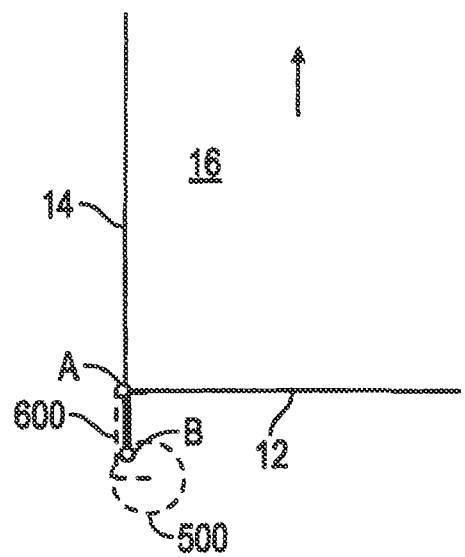
FIGS. 8A through 8C depict a mechanism which allows the roller to be manually pivoted out of the way to allow the opening of the door of the trailer.
Figure 8B:
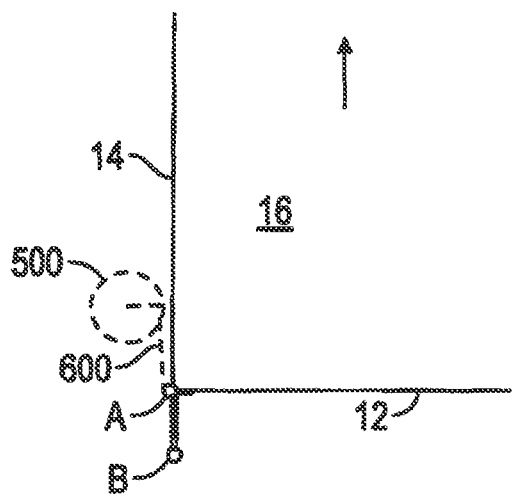
Figure 8C:
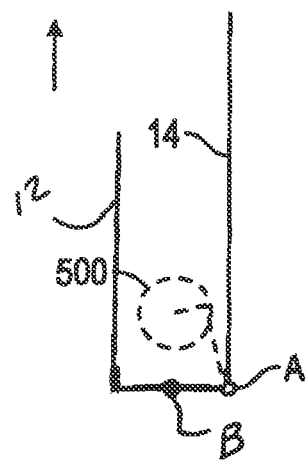

FIGS. 8A through 8C depict the progression of opening the trailer door 12 utilizing a mechanism which manually pivots the roller 500 out of the way as the doors are opened and swung approximately 270 degrees to a position where the edge of each door 12 is approximately parallel to the side 14 of the trailer 10, with the swinging edge 18 of each door is facing forward. This embodiment utilizes a door hinge 20 which replaces the existing door hinges on the trailer. Door hinge 20 has two pivot points, pivot point A and B, where door hinge 20 has a flange which is longer than one half of the roller diameter. In this embodiment, the axle 506 of roller 500 is mounted to bracket 502. Bracket 502 is attached to bracket arm 510 which has an end attached to trailer 10 at pivot point A, about which door 12 also pivots. In FIG. 8*b*, bracket arm 510 is rotated about pivot point A, thereby pivoting bracket 502 and the attached roller 500 against the side 14 of trailer 10. In FIG. 8*c*, the hinge flange pivots about pivot point A which provides room for door 12 to be pivoted 270 degrees from a closed position to a position where the swinging edge 18 of the door is facing forward.

FIGS. 9A through 9C depicts a second mechanism which allows the roller 600 to be manually pivoted out of the way to allow the opening of door 12 of trailer 10. However, in contrast to the embodiment depicted in FIGS. 8A through 8C, this mechanism uses the standard hinges on the trailer doors. In this mechanism, a receiver and locking pin at point A may be released to allow the swinging back of the roller 600 at pivot point C back along the side 14 of the trailer. Once so moved, doors 12 may be swung open in the conventional manner.

Figure 10A:
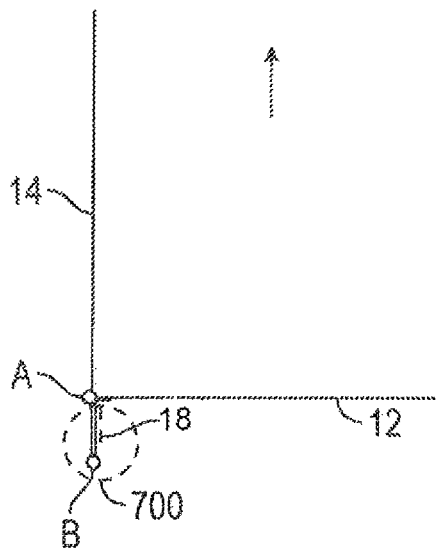
FIGS. 10A through 10D depict another embodiment of a mechanism which pivots the rollers out of the way to allow the opening of a door of the trailer.
Figure 10B:
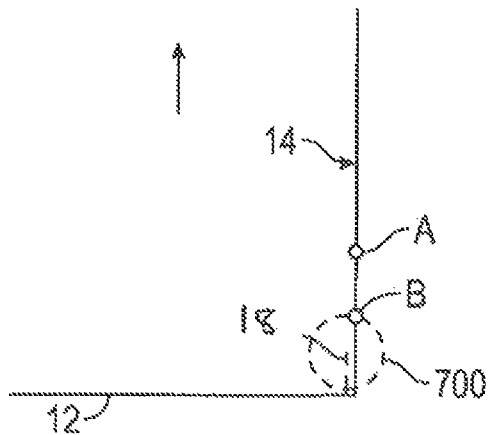
Figure 10C:
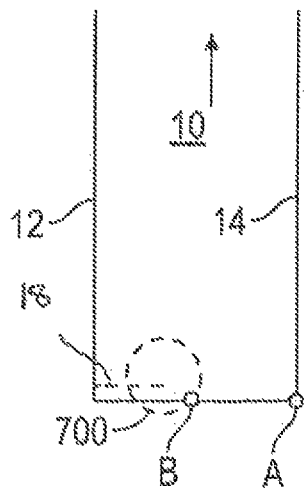
Figure 10D:
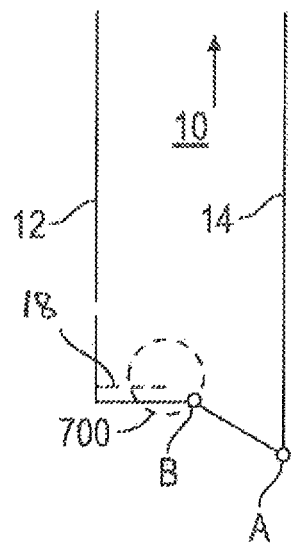

FIGS. 10A through 10D depict a third mechanism which automatically pivots roller assembly 700 out of the way as the trailer door 12 is opened. This embodiment requires a replacement door hinge. In this embodiment, roller assembly 700 is attached to bracket arm 18 which is fixed to door 12. FIG. 10A depicts the door 12 and roller assembly 700 in a traveling position. FIG. 10B depicts door 12 being swung open 180 degrees about pivot point B. FIG. 10C depicts door 12 being swung to a position parallel to side 14 about pivot point A, thereby swinging roller assembly 700 to a position facing side 14. FIG. 10D depicts door 12 and roller assembly 700 being moved forward by pivoting at pivot point A, thereby placing the door 12 and roller assembly 700 in an unloading position.

Figure 11A:
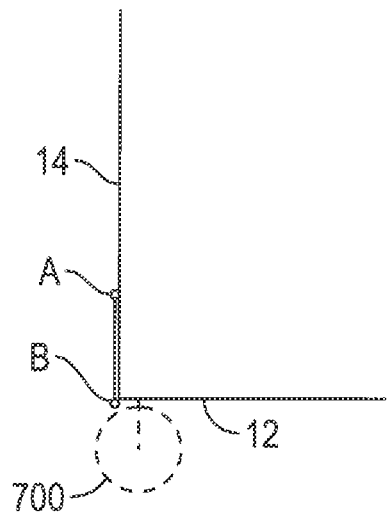
FIGS. 11A through 11C depict another embodiment of a mechanism which pivots the rollers out of the way to allow the opening of a door of the trailer.
Figure 11B:
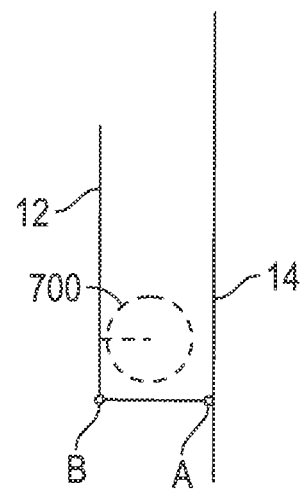
Figure 11C:
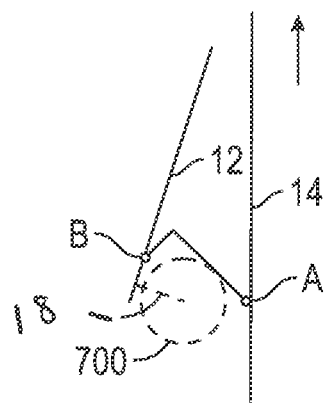

FIGS. 11A through 11C depict a fourth mechanism which automatically pivots roller assembly 700 out of the way as the trailer door 12 is opened. This embodiment requires a replacement door hinge. Roller assembly 700 is attached to bracket arm 18 which is fixed to door 12. FIG. 11A depicts the door 12 and the roller assembly 700 in a traveling position. In FIG. 11B, door 12 is swung 270 degrees along pivot points A and B so that the inside edge of the door is facing forward and is positioned along side 14 of the trailer. FIG. 11C depicts door 12 and roller assembly 700 being moved forward by pivoting about pivot points A and B, thereby placing the door 12 and roller assembly 700 in an unloading position.

Figure 12A:
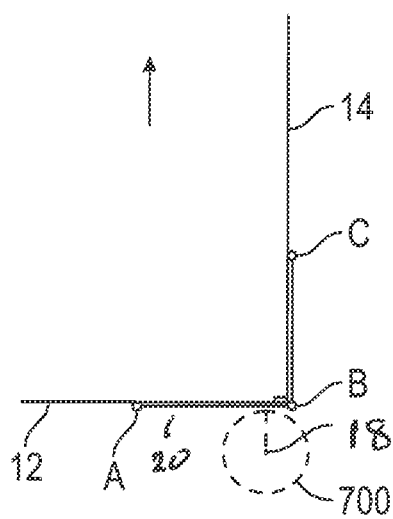
FIGS. 12A through 12C depict another embodiment of a mechanism which pivots the rollers out of the way to allow the opening of a door of the trailer.
Figure 12B:
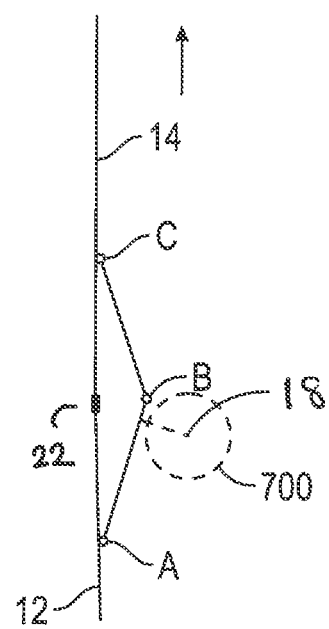
Figure 12C:
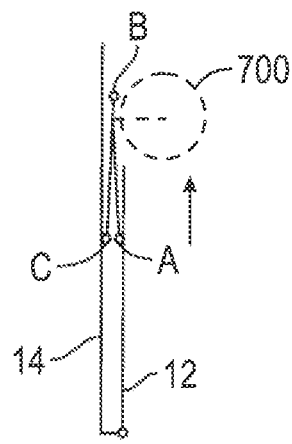

FIGS. 12A through 12C depict a fifth mechanism which automatically pivots roller assembly 700 out of the way as the trailer door 12 is opened. This embodiment may utilize the standard hinge 22 on the trailer. In this embodiment roller assembly 700 is attached to an arm 20 which is attached at pivot points A and B. FIG. 12A depicts the door 12 and the roller assembly 700 in a traveling position. FIG. 12 B depicts door 12 being swung open ninety degrees on its hinge 22, thereby causing arm 20 and roller assembly 700 being swung to the side 14 of the trailer. FIG. 12C depicts door 12 being swung an additional 180 degrees, thereby pushing arm 20 and the attached roller assembly 70 forward and out of the way of the door into an unloading position.

Figure 13A:
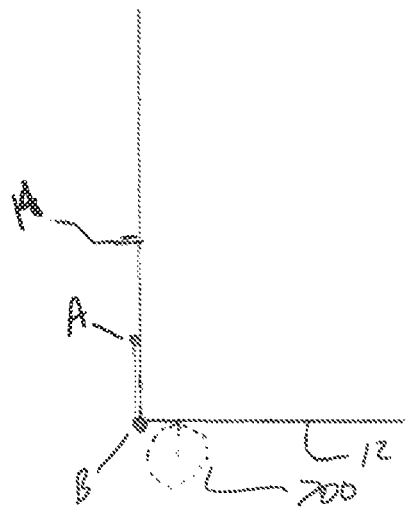
FIGS. 13A and 13B depict another embodiment of a mechanism which pivots the rollers out of the way to allow the opening of a door of the trailer.
Figure 13B:
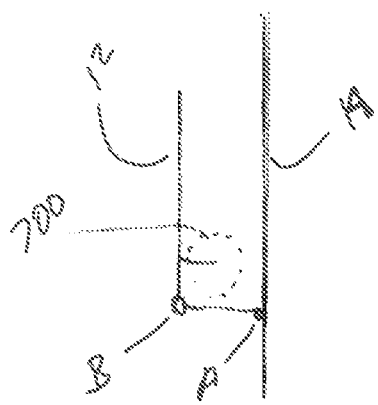

FIGS. 13A and 13B depict a sixth mechanism which automatically pivots roller assembly 700 out of the way as trailer door 12 is opened. FIG. 13A depicts the trailer door 12 and roller assembly 700 in the traveling position. FIG. 13B depicts the trailer door 12 and the roller assembly 700 in the unloading position, with the door pivoting about pivot points A and B.

Figure 14:
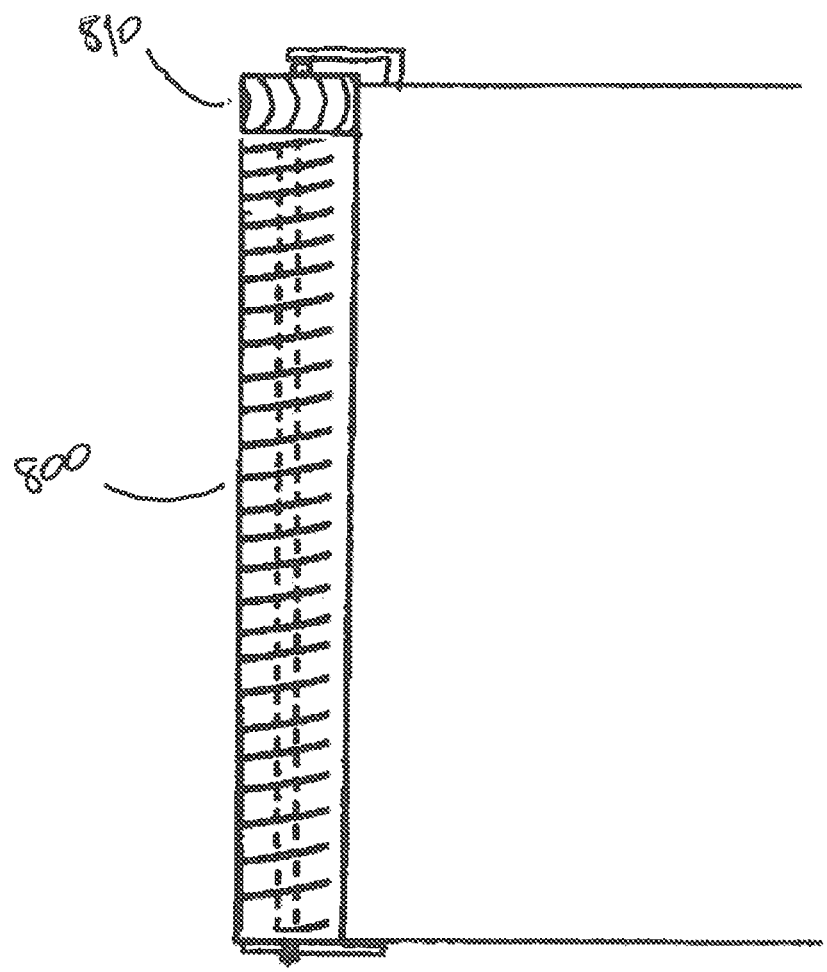
FIG. 14 depicts an embodiment of the invention having a wind catching fan member attached to the roller.

FIG. 14 depicts an embodiment of the invention having a wind catching fan member 810 which is attached to the roller 800. Wind catching member 810 may comprise scooped out pockets which catch the wind as the trailer is moving forward, causing wind catching member 810 to rotate, thereby assisting roller 800 to spin with greater velocity, thereby further disrupting the vacuum at the rear of the trailer.

Figure 15:
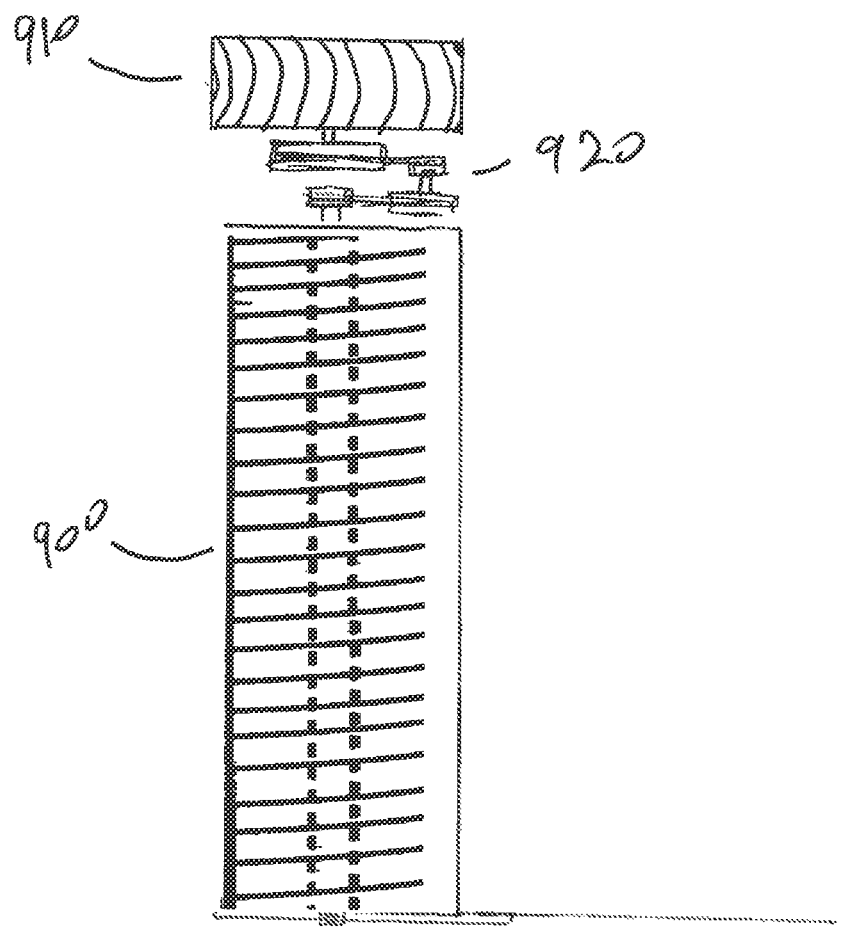
FIG. 15 depicts an embodiment of the invention having a wind catching fan member and a multiplier unit between the fan member and the roller.

FIG. 15 depicts an embodiment of the invention having a wind catching fan member 910 and a multiplier unit 920 between the fan member 910 and the roller 900. This embodiment allows the rotation of the wind catching member 910 to be multiplied by the multiplier unit such that the roller is induced to spin even faster than the wind catching fan member.

Having thus described the preferred embodiment of the invention, what is claimed as new and desired to be protected by Letters Patent includes the following:

1. An air drag reduction apparatus for use with a vehicle having a left side, a right side, and a generally rectangular rear end wherein said rectangular rear end comprises a left edge defined by the attachment of the generally rectangular rear end to the left side and a right edge defined by the attachment of the generally rectangular rear end to the right side, said apparatus comprising:
   a left side bracket mechanism attached to the vehicle;
   a left side roller mounted to the left side bracket mechanism in a vertical orientation, wherein a first longitudinal axis is defined by the left side roller and the left side roller is rotatable about the first longitudinal axis with respect to the left side bracket mechanism wherein a portion of the left side roller extends outwardly past the left edge thereby defining a left side roller extended position;
   a right side bracket mechanism attached to the vehicle; and
   a right side roller mounted to the right side bracket mechanism in a vertical orientation, wherein a second longitudinal axis is defined by the right side roller and the right side roller is rotatable about the second longitudinal axis with respect to the right side bracket mechanism wherein a portion of the right side roller extends outwardly past the right edge thereby defining a right side roller extended position.

2. The air drag reduction apparatus of claim 1 further comprising a left air foil member comprising a first surface having a leading edge and a trailing edge, the first surface disposed adjacent to an outside circumferential surface of the left side roller, the apparatus further comprising a right air foil member comprising a second surface having a leading edge and a trailing edge, the second surface disposed adjacent to an outside circumferential surface of the right side roller.

3. The air drag reduction apparatus of claim 1 wherein the left side bracket mechanism is pivotally attached to the vehicle and the right side bracket mechanism is pivotably attached to the vehicle.

4. The air drag reduction apparatus of claim 3 wherein the left side bracket mechanism is pivotable to move the left side roller from a left side roller operating position behind the vehicle to a left side roller unloading position in which the left side roller is adjacent to the left side of the vehicle, and the right side bracket mechanism is pivotable to move the right side roller from a right side roller operating position to a right side roller unloading position in which the right-side roller is adjacent to the right side of the vehicle.

5. The air drag reduction apparatus of claim 4 wherein the generally rectangular rear end comprises a left side door and a right side door, wherein the left side door and the right side door are in a closed position when the left side roller is in the left side roller operating position and the right side roller is in the right side roller operating position.

6. The air drag reduction apparatus of claim 5 wherein the left side roller moves from the left side roller operating position to the left side roller unloading position as the left side door is opened and the right side roller moves from the right side roller operating position to the right side roller unloading position as the right side door is opened.

7. The air drag reduction apparatus of claim 1 wherein the left side roller comprises an axially aligned opening.

8. The air drag reduction apparatus of claim 7 wherein a left axle extends through the axially aligned opening.

9. The air drag reduction apparatus of claim 8 wherein the left side roller is rotated by a fan member connected to the left axle.

10. The air drag reduction apparatus of claim 9 wherein a multiplier unit is disposed between the fan member and the left side roller.

11. The air drag reduction apparatus of claim 8 wherein the left side roller comprises a plurality of axially adjacent roller segments disposed in a stacked configuration on the left axle.

12. The air drag reduction apparatus of claim 1 further comprising a left air foil member comprising a surface having a leading edge and a trailing edge, the surface disposed adjacent to an outside circumferential surface of the left side roller.

13. A method of reducing drag on a vehicle, wherein the vehicle has a left side, a right side, and a generally rectangular rear end wherein said rectangular rear end comprises a left edge defined by the attachment of the generally rectangular rear end to the left side and a right edge defined by the attachment of the generally rectangular rear end to the right side, said method comprising the steps of:
- attaching a left side roller in a vertical orientation to the vehicle, wherein a portion of the left side roller extends outwardly past the left edge thereby defining a left side roller extended position, the left side roller disposed such that the left side roller is adjacent to the left edge, wherein said left side roller is rotatable about a first vertical axis; and
- attaching a right side roller in a vertical orientation to the vehicle, wherein a portion of the right side roller extends outwardly past the right edge thereby defining a right side roller extended position, the right side roller disposed such that the right side roller is adjacent to the right edge, wherein said right side roller is rotatable about a second vertical axis.

14. The method of claim 13 wherein the left side roller is attached to a left side bracket mechanism attached to the vehicle and the right side roller is attached to a right side bracket mechanism attached to the vehicle.

15. The method of claim 14 wherein the left side bracket mechanism is pivotable to move the left side roller from a left side roller operating position behind the vehicle to a left side roller unloading position in which the left side roller is adjacent to the left side of the vehicle, and the right side bracket mechanism is pivotable to move the right side roller from a right side roller operating position to a right side roller unloading position in which the right-side roller is adjacent to the right side of the vehicle.

16. The method of claim 15 wherein the generally rectangular rear end comprises a left side door and a right side door, wherein the left side door and the right side door are in a closed position when the left side roller is in the left side roller operating position and the right side roller is in the right side roller operating position.

17. The method of claim 16 wherein the left side roller moves from the left side roller operating position to the left side unloading position as the left side door is opened and the right side roller moves from the right side roller operating position to the right side unloading position as the right side door is opened.

18. An air drag reduction apparatus for use with vehicles having a left side, a right side, and a generally rectangular rear, said apparatus comprising:
- a left side bracket mechanism attached to the vehicle;
- a left side roller mounted to the left side bracket mechanism in a vertical orientation with the left side roller adjacent to the left side, wherein a first longitudinal axis is defined by the left side roller and the left side roller is rotatable about the first longitudinal axis;
- a left air foil member comprising a surface having a leading edge and a trailing edge, the surface disposed adjacent to an outside circumferential surface of the left side roller;
- a right side bracket mechanism attached to the vehicle;
- a right side roller mounted to the right side bracket mechanism in a vertical orientation with the right side roller adjacent to the right side, wherein a second longitudinal axis is defined by the right side roller and the right side roller is rotatable about the second longitudinal axis; and
- a right air foil member comprising a surface having a leading edge and a trailing edge, the surface disposed adjacent to an outside circumferential surface of the right side roller.

19. An air drag reduction apparatus for use with a vehicle having a first side, a second side, and a generally rectangular rear end wherein said rectangular rear end comprises a first edge defined by the attachment of the generally rectangular rear end to the first side and a second edge defined by the attachment of the generally rectangular rear end to the second side, said apparatus comprising:
- a first bracket mechanism attached to the first side of the vehicle;
- a roller mounted to the bracket mechanism in a vertical orientation, wherein a longitudinal axis is defined by the roller, the roller comprising an axially aligned opening with an axle extending through the axially aligned opening, wherein the roller is rotatable about the longitudinal axis with respect to the first side bracket mechanism; and
- a fan member connected to the axle, wherein the roller is rotated by the fan member.

20. An air drag reduction apparatus for use with a vehicle having a first side, a second side, and a generally rectangular rear end wherein said rectangular rear end comprises a first edge defined by the attachment of the generally rectangular rear end to the first side and a second edge defined by the attachment of the generally rectangular rear end to the second side, said apparatus comprising:
- a first bracket mechanism attached to the first side of the vehicle;
- a roller mounted to the bracket mechanism in a vertical orientation, wherein a longitudinal axis is defined by the roller, the roller comprising an axially aligned opening with an axle extending through the axially aligned opening, wherein the roller is rotatable about the longitudinal axis with respect to the first side bracket mechanism; and
- a motor connected to the axle, wherein the roller is rotated by the motor.

* * * * *

UNITED STATES PATENT AND TRADEMARK OFFICE
CERTIFICATE OF CORRECTION

PATENT NO. : 11,230,329 B1  
APPLICATION NO. : 16/700691  
DATED : January 25, 2022  
INVENTOR(S) : Steve White et al.

Page 1 of 1

It is certified that error appears in the above-identified patent and that said Letters Patent is hereby corrected as shown below:

On the Title Page

Item (12), delete "White" and insert --White et al.--

Item (72), Roger Johnson, Mercer Island, WA (US) should be added as an inventor

Signed and Sealed this  
Ninth Day of July, 2024

Katherine Kelly Vidal  
*Director of the United States Patent and Trademark Office*